R. REACH.
SWING.
APPLICATION FILED APR. 25, 1911.
1,063,730.
Patented June 3, 1913.
Fig. 1.
Fig. 2.
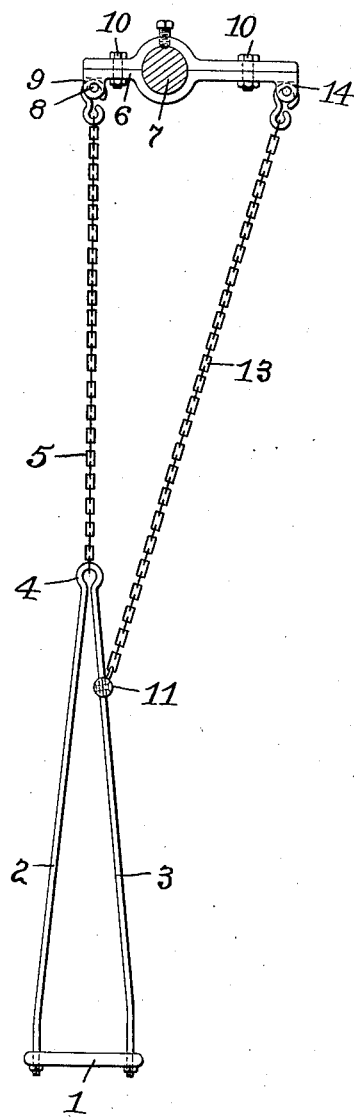
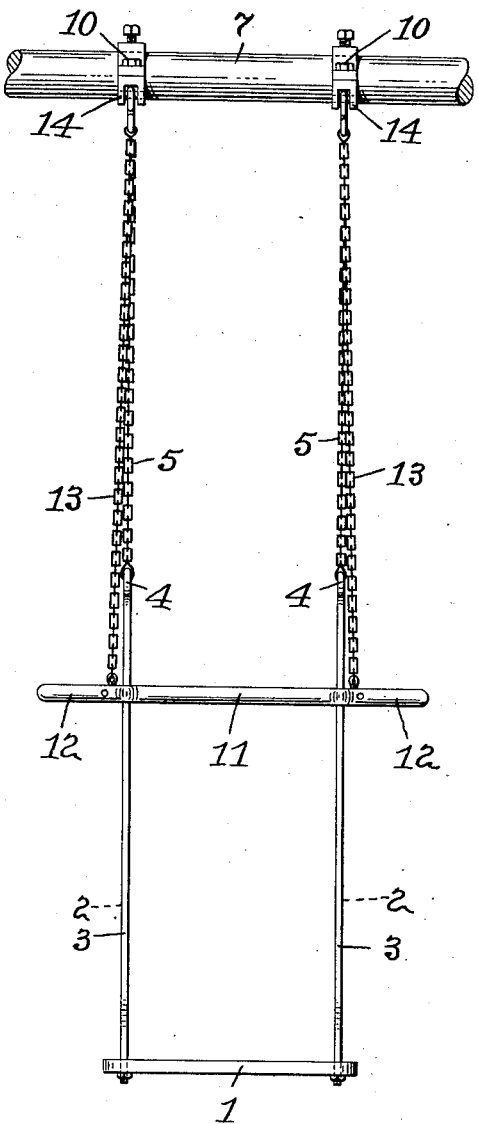
Attest:
Ewd L. Tolson
Edward N. Sartor
Inventor:
Robert Reach,
by Spear, Middleton, Donaldson & Spear
Attys.
COLUMBIA PLANOGRAPH CO., WASHINGTON, D. C.

UNITED STATES PATENT OFFICE.

ROBERT REACH, OF PHILADELPHIA, PENNSYLVANIA.

SWING.

1,063,730.  Specification of Letters Patent.  Patented June 3, 1913.

Application filed April 25, 1911. Serial No. 623,242.

*To all whom it may concern:*

Be it known that I, ROBERT REACH, citizen of the United States, residing at Philadelphia, Pennsylvania, have invented certain new and useful Improvements in Swings, of which the following is a specification.

My invention relates to swings for use in households or children's playgrounds and like situations, and it consists in the features and combination and arrangement of parts hereinafter described and particularly pointed out in the claims.

In the accompanying drawings Figure 1 is a side view of a swing constructed in accordance with my invention; Fig. 2 is a front view.

In these drawings, 1 indicates the seat of the swing to which at each end is connected the suspension means. These suspension means consist each of a rod bent to provide diverging sides 2 and 3, which are secured to the seat, the bent rods also providing a loop or eye portion at 4 to which is attached the chain or other flexible connection 5. These flexible connections are in turn connected to the rear extensions 6 of a bracket suitably held upon a cross piece 7, which may be mounted in a doorway or upon any suitable form of frame for outdoor use. The attachment is made by means of hooks engaging pins 8 carried by ears 9 depending from the rear end of the bracket. Each bracket is formed in two pieces, having semicircular portions to clamp the cross rods 7, the sections of the brackets being secured together by bolts at 10.

Slidably mounted upon the front members of each suspension frame or bar is a cross rod 11, the ends of which project beyond the suspension means to provide hand grips at 12, and from this cross rod flexible connections 13 extend upwardly and forwardly, and in substantially the same vertical plane from front to rear as the suspension means 5. At their upper ends the flexible connections 13 are attached to ears 14 on the front extensions of the brackets. The child, in order to operate the swing, grasps the hand grips 12, and pulls downwardly thereon, causing the cross bar 11 to slide vertically on the suspension rods 3, and in this way the child will not only secure amusement and pastime, but a healthful exercise.

As the operating connections lie in substantially the same vertical planes as the suspension means or in the vertical planes in which these parts move forwardly and backwardly, a force supplied to the operating cross bar is utilized to the maximum extent in causing the movement of the swing. By this construction also the space between the suspension means is left free with the exception of the cross bar, and furthermore, the lateral dimension of the swing is kept down to the minimum.

I claim as my invention:—

1. In combination in an exercising swing, a seat, a suspending connection at each side of the seat, propelling connections and a cross bar attached to the propelling connections, and slidably mounted on the suspending connections to move up and down along the same, substantially as described.

2. In combination in an exercising swing, a seat, a rigid frame attached to the seat at each side thereof and composed of downwardly diverging bars, suspending connections attached to the upper ends of said frames, a cross bar slidably mounted on the front inclined bars, and flexible impelling connections extending from the cross bar upwardly at an angle to the suspending connections, said cross bar spacing the propelling connections apart to prevent entangling of said connections and extending beyond the rigid frame at each side to form hand holds, substantially as described.

In testimony whereof I affix my signature in presence of two witnesses.

ROBERT REACH.

Witnesses:
WILLIAM F. REACH,
G. C. MCFEELY.

Copies of this patent may be obtained for five cents each, by addressing the "Commissioner of Patents. Washington, D. C."